United States Patent [19]
Oishi et al.

[11] 3,986,869
[45] Oct. 19, 1976

[54] PROCESS FOR MAKING ELECTROLYTIC CAPACITOR ANODES FORMING A CONTINUUM OF ANODES AND CUTTING THE CONTINUUM INTO INDIVIDUAL BODIES

[75] Inventors: Naoaki Oishi; Tomoo Izumi; Koichi Morimoto, all of Tokyo, Japan

[73] Assignees: Showa Denko Kabushiki Kaisha; Nippon Electric Company, Ltd., both of Tokyo, Japan

[22] Filed: Mar. 1, 1974

[21] Appl. No.: 447,259

[52] U.S. Cl. ............................... 75/208 R; 75/200; 75/222; 29/182.3
[51] Int. Cl.² ...................... B22F 8/00; C22C 1/04; B22F 7/00; B22F 1/00
[58] Field of Search ....................... 75/200, 222, 208

[56] References Cited
UNITED STATES PATENTS

| | | | |
|---|---|---|---|
| 3,403,303 | 9/1968 | Klein | 75/222 |
| 3,412,444 | 11/1969 | Klein | 75/222 |
| 3,422,515 | 1/1969 | Klein | 75/222 |
| 3,424,952 | 1/1969 | Vierow | 75/200 |
| 3,476,557 | 11/1969 | Fincham | 75/222 |

*Primary Examiner*—Benjamin R. Padgett
*Assistant Examiner*—Josephine Lloyd
*Attorney, Agent, or Firm*—Ostrolenk, Faber, Gerb & Soffen

[57] ABSTRACT

Electrolytic capacitor anodes are made by sintering metal powder for the anodes in a mold cavity into a continuum of anode bodies and by cutting the continuum into individual bodies. Lead wires for the anodes may either be placed in the mold cavity before the sintering step or welded to predetermined ones of the anode bodies after the sintering step and before the cutting step. A metal support may be attached to the lead wires before the cutting step.

15 Claims, 13 Drawing Figures

PROCESS FOR MAKING ELECTROLYTIC CAPACITOR ANODES FORMING A CONTINUUM OF ANODES AND CUTTING THE CONTINUUM INTO INDIVIDUAL BODIES

BACKGROUND OF THE INVENTION

This invention relates to a process for making porous anodes for electrolytic capacitors. The capacitors may be either of the sophisticated type and the solid type.

Anode bodies for use in manufacturing these anodes have been made by adding a binder, such as water, camphor, or polyethylene glycol, to metal powder for the anodes, such as tantalum, niobium, titanium, or aluminium powder, weighing the resulting mixture in compliance with the electrostatic capacity for each anode, press-forming pellets cavities of the mixture together with lead wires for the anodes in cavities of the mold, and sintering the pellets into anode bodies each having a lead wire. Subsequently, solid electrolytic capacitors may be formed through the steps generally called the batch assembly, by arranging the anode bodies in order and with a predetermined orientation, welding a metal support to the lead wires, anodizing the anode bodies by application thereto of an electric power of a predetermined current until the voltage reaches a predetermined value in an anodizing solution, such as an aqueous solution of sulfuric or phosphoric acid, to form dielectric oxide layers on the respective anode bodies, depositing semiconductor layers, such as manganese dioxide layers, on the dielectric layers, further depositing conductive layers, such as colloidal carbon and silver paint layers, on the semiconductor layers, and putting the capacitor elements thus formed in capacitor casings.

On press-forming the pellets, it is necessary to make the weighed mixture flow into each mole cavity through a hopper in a short period of time. In addition, it is necessary to press-form each pellet. This complicates the process and requires that the flowability of the mixture and the mechanical strength of the pellets be sufficient to avoid deformation before sintering thereof. Therefore, particular care must be paid to preparation of the mixture and further complicates the process. Even if specific care is taken, it is necessary to press-form the mixture into pellets of a high bulk density to avoid deformation. This reduces the porosity of the anodes and the dimensions of the pores formed therein, thereby reducing the effective surface area of each anode and the electrostatic capacity per unit weight of the anode while increasing the loss factor (tan δ) of the capacitor and adversely affecting impregnation of the anodes with the semiconductor material.

In U.S. Pat. No. 3,467,557 issued to J. B. Fincham, a process for making an electrolytic capacitor porous anode is disclosed which comprises in essence the steps of introducing metal powder for the anode into a mold to provide a loosely disposed mass of the powder with a bulk density of about 3 to 6 g/cc, pre-sintering the powder to form a coherent self-supporting pellet, and sintering the pellet into the anode. This requires an additional step of pre-sintering.

In U.S. Pat. No. 3,422,515 issued to G. P. Klein, a process of the kind described is revealed which comprises in essence the steps of moistening metal powder for the anodes, placing the moistened powder in mold cavities, freezing the powder into frozen pellets, thawing the frozen pellets, and sintering the resulting powder deposits. This requires additional steps of freezing and thawing.

With both of these processes of the patents, it is possible with advantages to reduce the bulk density of the pellets. The pellets, however, are formed in the respective mold cavities. This requires no less flowability of the metal powder than the sophisticated processes and no less complicated steps of preparing the metal powder. In addition, the additional processes mentioned above are necessary in order to achieve sufficient mechanical strength of the pellets.

SUMMARY OF THE INVENTION

It is therefore an object of the present invention to provide a process for making anodes for electrolytic capacitors, which comprises more simplified steps than the conventional processes.

It is another object of this invention to provide a process of the kind described, which produces anodes of high electrostatic capacity per unit weight of the anodes.

It is still another object of this invention to provide a process of the kind described, which gives anodes of small loss factor (tan δ).

In accordance with this invention, a plurality of anode bodies for electrolytic capacitors are simultaneously made in a single mold cavity. More particularly, the process comprises the steps of putting metal powder for the anodes in a mold cavity of a shape of a continuum of the anode bodies, sintering the metal powder into the continuum of anode bodies, and cutting the continuum into anode bodies, from which the anodes may be made in a conventional manner.

Preferably, excess metal powder is removed from the mold by a straight edge. After the sintering step and before the cutting step, a plurality of lead wires are welded to the anode bodies and then a metal support is welded to the lead wires. The lead wires having a metal support preliminarily welded thereto may be welded to the anode bodies. Alternatively, a plurality of lead wires may be placed in the mold cavity prior to the sintering step in case the dimensions of the anode bodies are preliminarily given.

DESCRIPTION OF THE PREFERRED EMBODIMENTS

Metal powder for use in a process according to the present invention may be of a known anode metal, such as tantalum, titanium, niobium, or aluminium. The metal powder may be prepared by any known method, such as reduction, electrolysis, atomization, crushing, or the like, and may preferably be finer than 35 Tyler mesh.

A mold having at least one mold cavity for use in a process according to this invention may be made of any of the known metals, oxides, nitrides, and carbides which are stable at the temperature for sintering the metal powder into anode bodies. When the sintering temperature is 1500° C or lower, use may be made of tantalum, tantalum oxide ($Ta_2O_5$), titanium nitride (TiN), zirconium nitride (ZrN), or boron nitride (BN). When the sintering temperature is between 1500° and 2000° C, use may be made of calcium oxide (CaO), magnesium oxide (MgO), zirconium oxide ($ZrO_2$), bellyrium oxide (BeO), or aluminium oxide ($Al_2O_3$). When the sintering temperature is 2000° C or higher, use may be made of thorium oxide ($ThO_2$), tantalum carbide (TaC), titanium carbide (TiC), or zirconium carbide (ZrC).

Although the conditions for sintering differ according to the material of the metal powder, sintering may generally be carried out in vacuum or in an inert atmosphere at a temperature below the melting point of the material for from ten minutes to five hours. For tantalum, sintering is preferably carried out at a temperature between 1500° and 2000° C for from ten minutes to five hours.

The continuum may be of any shape, provided that a plurality of anode bodies may be cut therefrom. A simple shape, however, is preferred in order to facilitate putting the metal powder in the mold cavity and attaching the lead wires to the anode bodies. In case the dimensions of the anode bodies are preliminarily given, the continuum may be provided with thin portions for facilitating the cutting step.

Figure 1:
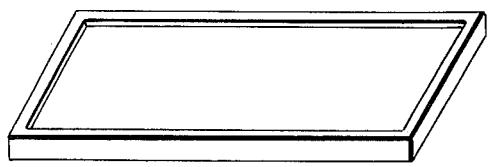
FIG. 1 is a perspective view of a mold for use in a process according to the instant invention.
Figure 2:
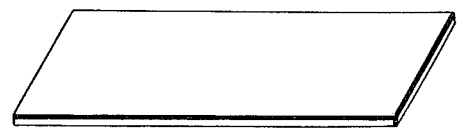
FIG. 2 is a similar view of a continuum of anode bodies made by the use of the mold illustrated in FIG. 1.

Referring now to FIGS. 1 and 2, the metal powder is put in a mold cavity of a mold shown in FIG. 1 with the excess powder removed by a straight edge (not shown). After sintering the metal powder together within the mold, it is possible to obtain a continuum of anode bodies shown in FIG. 2.

Figure 3:
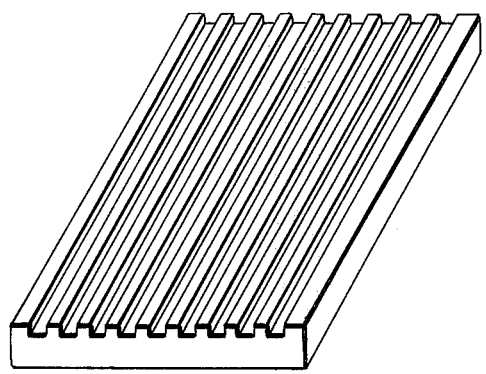
FIG. 3 is a perspective view of another mold for use in a process according to this invention.
Figure 4:
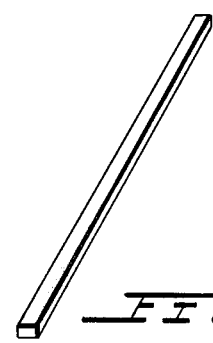
FIG. 4 is a similar view of one of the continua of anode bodies made by the use of the mold shown in FIG. 3.

Referring to FIGS. 3 and 4, the metal powder is put in a plurality of mold cavities of a mold illustrated in FIG. 3, with the excess powder removed by a straight edge from the upper and end surfaces of the mold. Sintering of the metal powder and the mold results in a plurality of continua of anode bodies, one of which is exemplified in FIG. 4.

Figure 5:
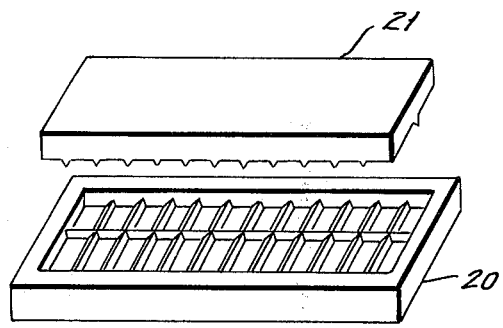
FIG. 5 is a perspective view of still another mold for use in a process according to this invention.
Figure 6:
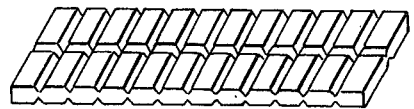
FIG. 6 is a similar view of a continuum of anode bodies made by the use of the mold shown in FIG. 5.

Referring to FIGS. 5 and 6, a mold 20 has a plurality of ridges protruding from the bottom wall into the mold cavity. After the metal powder is put in the cavity, the excess powder is removed by a straight edge and then a cover 21 having a plurality of corresponding ridges is put on the mold 20. Sintering of the metal powder in the mold 20, with or without the cover 21, results in a continuum of anode bodies having a corresponding plurality of thin portions as illustrated in FIG. 6. It should be understood that a plurality of ridges may also be utilized in the mold cavity shown in FIG. 3, to form a rod-shaped continuum having a like plurality of thin portions, as illustrated in FIG. 10.

Figure 7:
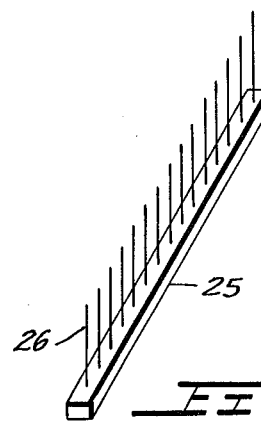
FIG. 7 is a perspective view of the continuum of anode bodies illustrated in FIG. 4, to which a plurality of lead wires are attached.

Referring to FIG. 7, a rod-shaped continuum 25 of anode bodies having a plurality of lead wires 26 may be made by putting the lead wires 26 into the metal powder put in the mold cavities shown in FIG. 3 and sintering the metal powder, thereby fixing the lead wires 26 to the sintered continuum of anode bodies 25. The lead wires 26 should best be made of the same material as the metal powder. Alternatively, the lead wires 26 may be held in place in the mold cavity by means not shown and then the metal powder may be put in the mold cavity. As a further alternative, one of the lead wires 26 may be welded to each of the anode bodies 25 in the continuum.

Figure 8:
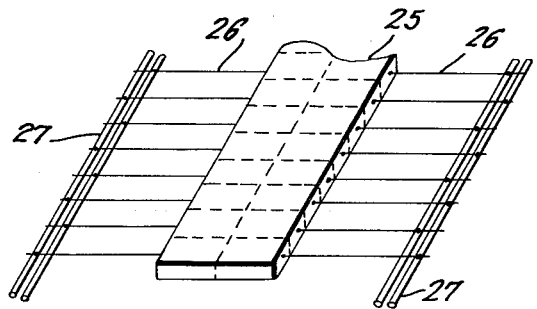
FIG. 8 is a perspective view of the continuum of anode bodies depicted in FIG. 6, to which a plurality of lead wires having four metal supports welded thereto are attached.
Figure 9:
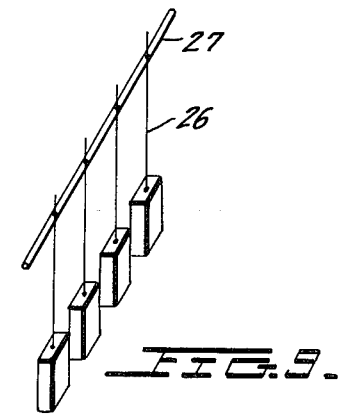
FIG. 9 is a similar view of a unit of anode bodies cut from the assembly shown in FIG. 8.

Referring to FIGS. 8 and 9, a sintered continuum 25, as shown in FIG. 2, may be provided with a plurality of lead wires 26 welded thereto with lead wires 26 extending from both sides of the continuum 25. Four metal supports 27 are welded to alternating ends of the lead wires 26 extending on opposite sides of the continuum 25. The continuum 25 is now cut into four units of anode bodies, each unit having its lead wires 26 welded to one of supports 27, as shown in FIG. 9.

Figure 10:
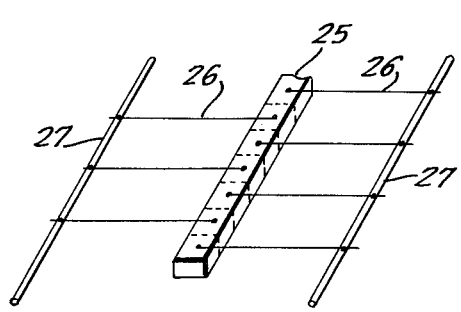
FIG. 10 is a perspective view of the continuum of anode bodies shown in FIG. 4, to which a plurality of lead wires having two metal supports welded thereto are welded.
Figure 11:
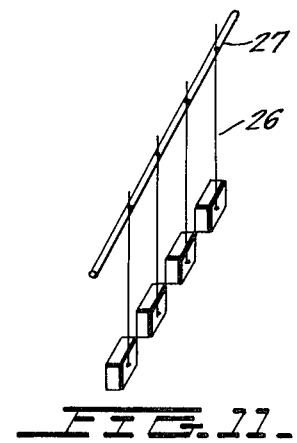
FIG. 11 is a similar view of a unit of anode bodies cut from the assembly shown in FIG. 10.

Referring now to FIGS. 10 and 11, a sintered continuum 25 shown in FIG. 4 may be provided with a plurality of lead wires 26 welded thereto and extending from both sides of the continuum 25. A pair of metal supports 27 are welded to the lead wires 26 extending on both sides of the continuum 25. The continuum 25 is cut along thin portions, as shown by the dashed lines, into two units, one of which is illustrated in FIG. 11.

Figure 12:
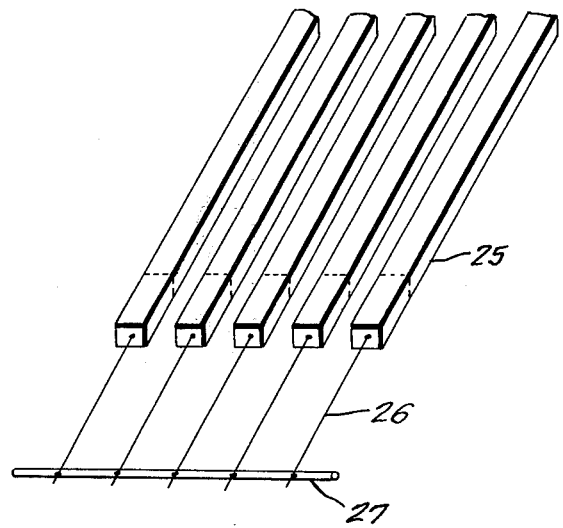
FIG. 12 is a perspective view of a plurality of continua of anode bodies, to which a plurality of lead wires having a metal support welded thereto are attached.
Figure 13:
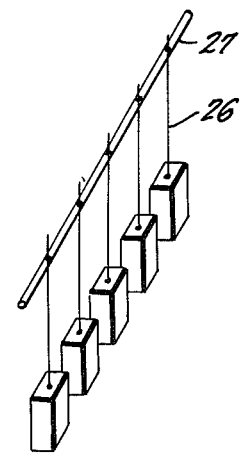
FIG. 13 is a similar view of a unit of anode bodies cut from the assembly illustrated in FIG. 12.

Referring to FIGS. 12 and 13, sintered rod-shaped continua 25 made by the use of a mold depicted in FIG. 3 are provided with a plurality of lead wires 26 welded to the corresponding ends of the rods. A metal support 27 is welded to the lead wires 26 and then a unit is cut from the assembly. The unit is shown in FIG. 13. The remaining continua may likewise be provided with a plurality of lead wires (not shown) and similar units may be cut successively from such assemblies.

The lead wires may be welded to the continuum by resistance welding or electron beam welding. The continuum may be cut into individual anode bodies having the lead wires and the metal support attached thereto by the use of a laser beam, an electron beam, or any of the usual cutters.

In connection with a process according to this invention, it may be pointed out here that it is unnecessary to form the individual pellets. This simplifies the process. In addition, it is possible to remove the problems of flowability and formability of the metal powder. This facilitates preparation of the metal powder. Although the cutting step or the cutting and lead-wire welding steps are additionally necessary according to this invention, this fact reduces the steps otherwise required in carrying out the batch assembly rather than complicating the whole process for completing electrolytic capacitor anodes and the ultimate electrolytic capacitors.

The metal powder may preliminarily be mixed with a known binder that either vaporizes, sublimates, or decomposes during the sintering step, such as water, camphor, or polyethylene glycol. In this event, sintering may be carried out either together with the mold or with a self-sustaining pellet of the metal powder remove from the mold.

The metal powder is placed in the mold cavity with a bulk density that is not less than the bulk density of the metal powder. The preferred bulk density of the metal powder put in the mold cavity is one to two and a half times the bulk density of the powder. When the bulk density is too small, mechanical strength of the sintered anode bodies is not sufficient and gives rise to inconveniences during the cutting step. Too great a bulk density reduces the porosity of the resulting anodes and the electrostatic capacity per unit weight and increases the loss factor. It should be noted, however, that the merit in this invention of omitting the step of forming individual self-sustaining pellets of the metal powder is not lost even with a bulk density greater than the range given above.

EXAMPLE 1

Use was made of tantalum powder prepared by reducing potassium fluorotantalate ($K_2TaF_7$) with metal sodium. The tantalum powder had a bulk density of 2.42 gm/cm$^3$, a specific surface area of 980 cm$^2$/g, and a particle-size distribution such that 30 percent by weight of the powder is of from 250 to 325 Tyler mesh while the balance is finer than 325 Tyler mesh. A mold cavity, of the shape exemplified in FIG. 1, and whose dimensions were 150 mm long, 20 mm wide, and 2 mm deep, was made of highly pure boron nitride. The mold received 15 grams of the powder with a density of 2.5 g/cm$^3$. Thd powder was sintered in a vacuum of between $10^{-4}$ and $10^{-6}$ Torr at 1500° C for four hours. The sintered mass was removed from the mold. Tantalum lead wires were welded to the mass in a form shown in FIG. 8. Nickel supports were welded to the lead wires. The mass was cut into twenty pieces of anode bodies with a cutter to provide four units, such as the unit illustrated in FIG. 9.

Ten anode bodies were put in an aqueous solution containing 0.01 percent by weight of phosphoric acid and simultaneously subjected to formation at 90° ± 2° C with a current density of from 30 to 35 mA/g until the voltage reached 100 volts. The novel anodes thus made were then put in an aqueous solution containing 10 percent by weight of phosphoric acid and a tantalum plate was used as the cathode; the specific electrostatic capacity (CV) and the loss factor (tan δ) were measured at 25° ± 2° C with 120 Hz. Subsequently, the leakage current (LC) was measured with application of a 70-volt voltage. Five of the remaining novel anode bodies were subjected to formation under the conditions given above. With the voltage for formation raised, the scintillation voltage (SV) was measured. For the still remaining five novel anode bodies, the sintered density (SD) was measured.

For reference, the tantalum powder mentioned above was press-formed into 20 pellets with a green density of 6 g/cm$^3$, each corresponding to a sintered anode body of 0.75 g in weight and 4 mm in diameter. The pellets were sintered and then subjected to formation under the conditions given above. Similar measurements were carried out with these conventional anodes and anode bodies.

The averages of the measurements obtained are listed in Table 1 given above.

Table 1

| Anodes | CV (μF.V/g) | tan δ (%) | LC (μA/g) | SV (V) | SD (g/cm$^3$) |
|---|---|---|---|---|---|
| conventional | 8000 | 14.2 | 1.95 | 200 | 6.85 |
| novel | 10070 | 7.5 | 1.58 | 276 | 3.40 |

EXAMPLE 2

The tantalum powder used in Example 1 was likewise put in a similar mold cavity of a mold made of highly pure alumina and sintered in a vacuum between $10^{-4}$ and $10^{-6}$ Torr at 1700° C for 30 minutes. The sintered mass was similarly processed and cut into 18 anode bodies. Nine anode bodies thus made were treated in the same manner as in Example 1. The specific electrostatic capacity and the loss factor were measured with these novel anodes in a like manner. For five of the remaining novel anode bodies, the scintillation voltage was likewise measured. For the still remaining four novel anode bodies, the sintered density was measured.

For reference, the same powder was press-formed with each of green densities of 5 g/cm$^3$ and 7 g/cm$^3$ into eighteen pellets, each corresponding to a sintered anode body of 0.83 g in weight and 4 mm Table 2

| Anodes | CV (μF.V./g) | tan δ (%) | LC (μA/g) | SV (V) | SD (g/cm$^3$) |
|---|---|---|---|---|---|
| conventional | | | | | |
| 5 g/cm$^3$ | 6354 | 14.1 | 0.61 | 240 | 6.37 |
| 7 g/cm$^3$ | 5362 | 17.4 | 0.52 | 261 | 8.46 |
| novel | 7970 | 9.7 | 0.56 | 264 | 3.80 | in diameter. After the pellets were sintered under the conditions used for the eighteen novel anodes, corresponding measurements were carried out with the conventional anodes and anode bodies, 36 in total.

The averages of the values obtained are listed above in Table 2.

EXAMPLE 3

Use was made of metal powder prepared in a manner similar to that resorted to in preparation of the metal powder used in Examples 1 and 2 and having a bulk density of 3.35 g/cm$^3$, a specific surface area of 475 cm$^2$/g, and a particle-size distribution such that 40 percent by weight of the powder was of from 60 to 325 Tyler mesh while the balance was finer than 325 Tyler mesh. Sixty grams of the metal powder were put in five mold cavities, each 200 mm long. 5 mm wide, and 4 mm deep, of a mold made of highly pure thorium oxide into a shape exemplified in FIG. 3, with a density of 3.5 g/cm$^3$. The powder was sintered in a vacuum between $10^{-4}$ and $10^{-6}$ Torr at 2000° C for 30 minutes. To one of the sintered masses, lead wires were welded and subsequently a pair of metal suports were welded to the lead wires in the manner illustrated with reference to FIG. 10. The mass was cut into a pair of units, each having eight anode bodies in the manner depicted in FIG. 11. Five of the novel anode bodies were subjected to formation with the ultimate voltage of 200 volts. The specific electrostatic capacity and the loss factor were measured under the conditions mentioned in Example 1. With the remaining three novel anode bodies, the sintered density was measured.

For reference, the metal powder was press-formed into eight pellets with a green density of 7 g/cm³, each corresponding to a sintered Table 3

| Anodes | CV ($\mu$F.V/g) | tan $\delta$ (%) | SD (g/cm³) |
|---|---|---|---|
| conventional | 3100 | 11.3 | 8.4 |
| novel | 4000 | 7.5 | 4.9 | anode body of 0.75 g in weight and 5 mm in diameter. After the pellets were sintered under the conditions given above, corresponding measurements were carried out.

The averages of the values obtained are listed above in Table 3.

EXAMPLE 4

Use was made of atomized powder of 99.99-percent pure aluminium having a particle-size distribution such that a half by weight of the powder is of from 60 to 325 Tyler mesh and the remainder is finer than 325 Tyler mesh. The powder was put with a density of 1.4 g/cm³ in five mold cavities of a mold made of highly pure alumina into the like shape as in Example 3 and was sintered in a vacuum of between $10^{-4}$ and $10^{-6}$ Torr at 630° C for 60 minutes. The sintered masses were processed in the manner similar to that of Example 3 into ten units, each having 20 anode bodies. The anode bodies were subjected to formation in an aqueous solution of citric acid with the ultimate voltage of 50 volts. Impregnation with manganese nitrate solution and subsequent thermal decomposition of manganese nitrate were repeated several times to fill the pores with manganese dioxide. The specific electrostatic capacity and the loss factor were measured with the novel anodes having the conventional impregnation.

Table 4

| Impregnated anodes | CV ($\mu$F.V/g) | tan $\delta$ (%) |
|---|---|---|
| conventional | 2180 | 7.5 |
| novel | 2700 | 5.8 |

For reference, the aluminium powder was press-formed with a green density of 1.7 g/cm³ into twenty pellets, each corresponding to a sintered anode body of 0.13 g in weight and 4 mm in diameter. After the conventional anode bodies were sintered and subjected to formation and impregnation under the conditions given above, the specific electrostatic capacity and the loss factor were measured.

The averages of the results obtained are listed above in Table 4.

EXAMPLE 5

Having been put in a mold cavity of a mold made of highly pure boron nitride of the shape illustrated in FIG. 5, the tantalum powder used in Example 1 was sintered under the conditions given in Example 1 with the corresponding cover also shown in FIG. 5 placed on the mold. The sintered mass was 380 mm long, 7.6 mm wide, and 2 mm thick and had 200 portions, 3.8 mm square each, bounded by recesses of a depth of 0.5 mm from each surface. With the mass set on a jig, tantalum lead wires were resistance-welded to the respective portions and then four nickel supports were resistance-welded to the lead wires in the manner shown in FIG. 8. The mass was cut into four units, each having 50 novel anode bodies, each weighing 1.1 g.

For reference, the tantalum powder was press-formed with

Table 5

| Steps | Conventional | Novel |
|---|---|---|
| Shaping | 36 | 0 |
| Pre-sintering | 1 | 0 |
| Sintering | 1 | 1 |
| Setting in jig | 30 | 0 |
| Welding | 32 | 60 |
| Cutting | 0 | 5 |
| Total | 100% | 66% | a green density of 6 g/cm³ into two hundred pellets, each corresponding to a sintered anode body of 1.1 g in weight and 5 mm in diameter. After the pellets were sintered under the conditions given above, the sintered anode bodies were set in a jig and assembled into four units, each having 50 conventional anode bodies.

The time required in each step listed in Table 5 is also given therein with the total time for completing the conventional steps being expressed as 100 percent.

While the process according to this invention was manually carried out in Example 5, automatic apparatus are readily applicable to a process according to this invention. As a result of calculation, it is possible to reduce the total time required to complete the steps listed above to about 10 percent of that required in the conventional process.

What is claimed is:
1. An improved process for making a plurality of anodes for use in electrolytic capacitors, each of said anodes comprising an anode body formed of a metal substance and having a lead wire electrically connected thereto, the process being of the type comprising the steps of providing a quantity of the metal substance in powder form, filling a mold cavity with at least a part of the metal powder, sintering the powder into sintered pellets, and fabricating each of said plurality of anodes from one of said sintered pellets, wherein the improvement comprises the steps of:
   shaping the mold cavity into the form of a continuum of said anode bodies;
   packing the metal powder in the mold cavity with a bulk density of from one to two and one-half times the bulk density of the unpacked metal powder and after the packing step, performing one sintering step for sintering the metal powder to form the final continuum thereby avoiding the necessity for pre-solidification or presintering of the powder; and
   cutting the sintered continuum into individual anode bodies.
2. A process as claimed in claim 1, further comprising the step of removing excess metal powder from the mold cavity with a straight edge.
3. A process as claimed in claim 2, wherein said mold cavity is of a plate shape.
4. A process as claimed in claim 3, wherein said mold cavity has a bottom surface; said process further com- prising the step of providing a plurality of thin ridges extending into the volume of the mold cavity to form a like plurality of thin portions in the plate-shaped continuum.

5. A process as claimed in claim 1, wherein said mold cavity is of a rod shape.

6. A process as claimed in claim 5, wherein said mold cavity has a bottom surface; said process further comprising the step of providing a plurality of thin ridges extending into the volume of the mold cavity to form a like plurality of thin portions in the rod-shaped continuum.

7. A process as claimed in claim 2, wherein said sintering step is carried out in vacuum for from ten minutes to five hours.

8. A process as claimed in claim 2, wherein said sintering step is carried out in an inert atmosphere for from ten minutes to five hours.

9. A process as claimed in claim 1, further comprising the steps of placing lead wires for said anode bodies in said mold cavity before said sintering step and of attaching a metal support to said lead wires after said sintering step and before said cutting step.

10. A process as claimed in claim 1, further comprising the steps of welding lead wires to predetermined ones of said anode bodies and attaching a metal support to said lead wires, said welding and attaching steps being carried out after said sintering step and before said cutting step.

11. A process as claimed in claim 1, wherein said metal powder is finer than 325 Tyler mesh.

12. An anode for an electrolytic capacitor made by the process of claim 1.

13. An anode for an electrolytic capacitor made by the process of claim 2.

14. An anode for an electrolytic capacitor made by the process of claim 9.

15. An anode for an electrolytic capacitor made by the process of claim 10.

* * * * *